UNITED STATES PATENT OFFICE.

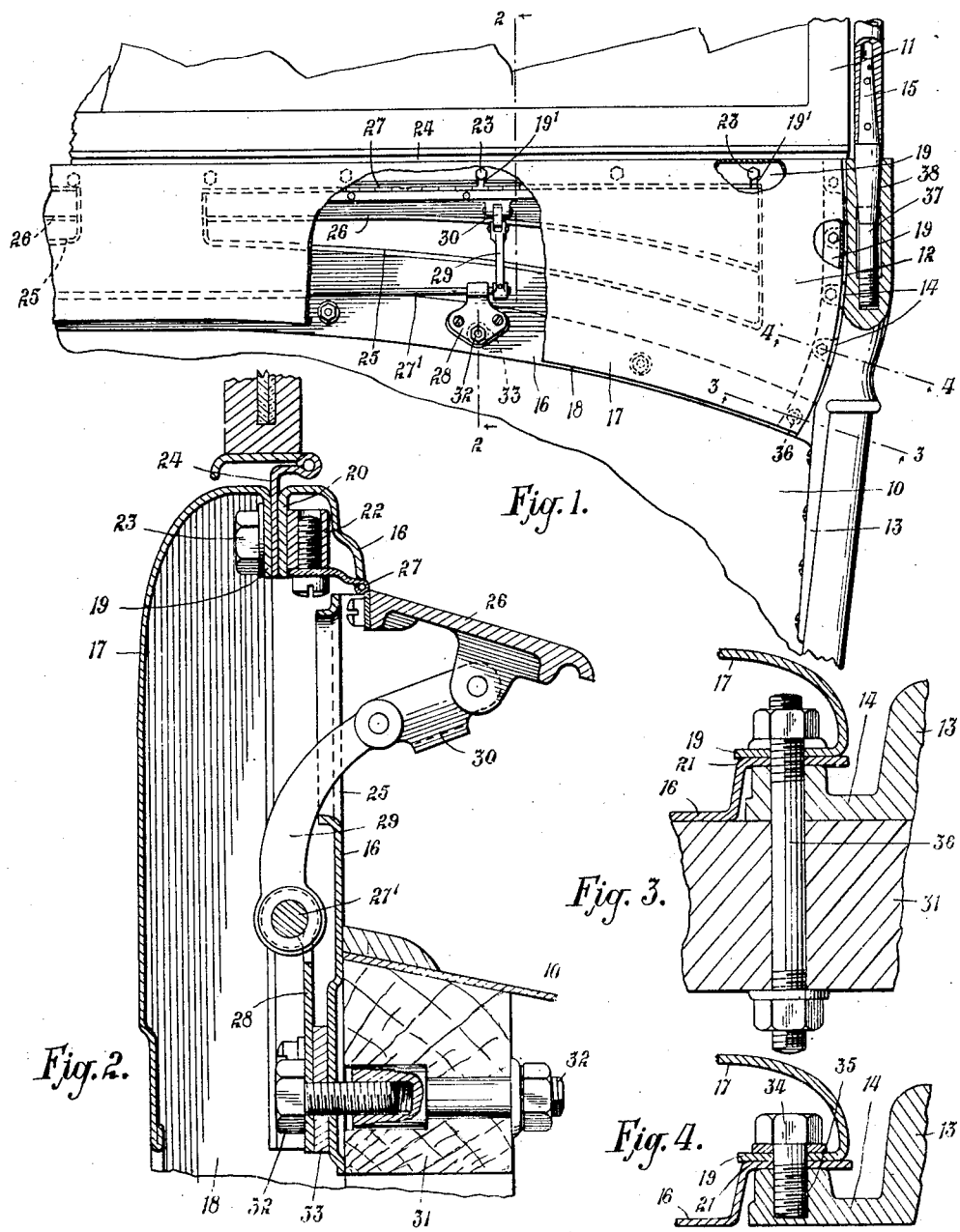

ORMOND E. HUNT, OF DETROIT, MICHIGAN, ASSIGNOR TO PACKARD MOTOR CAR COMPANY, OF DETROIT, MICHIGAN, A CORPORATION OF MICHIGAN.

WINDSHIELD.

1,355,079.  Specification of Letters Patent.  Patented Oct. 5, 1920.

Application filed October 18, 1916. Serial No. 126,377.

*To all whom it may concern:*

Be it known that I, ORMOND E. HUNT, a citizen of the United States, and resident of Detroit, Wayne county, State of Michigan, have invented certain new and useful Improvements in Windshields, of which the following is a specification.

This invention relates to an improvement in motor vehicles and particularly to an improvement in windshields and associated parts.

One object of the invention is to provide a filler board between the windshield and dash cowl which conducts air into the front compartment of the motor vehicle.

Another object of the invention is to provide a filler board made up of sheet metal plates joined at the top and edges and open at the bottom having ports in the front plates through which air passes into the filler board and thence to the front compartment of the vehicle and shutters for controlling such passage of air.

Another object is to provide tapering means joining the filler board brackets to the windshield stanchions mounted thereon.

Another object is to provide means for anchoring the filler board to the dash cowl.

Other objects of the invention will appear from the following description taken in connection with the accompanying drawings which form a part of the specification, and in which:—

Figure 1 is an elevation of part of a motor vehicle embodying this invention;

Fig. 2 is a transverse section on the line 2—2 of Fig. 1;

Fig. 3 is a transverse section on the line 3—3 of Fig. 1; and

Fig. 4 is a transverse section on the line 4—4 of Fig. 1.

In the drawings 10 designates the dash cowl of a motor vehicle on which is mounted a windshield 11 and, between the windshield and the cowl, a filler board 12. One half only of these elements is shown and will be described but it will be understood that the other half corresponds in every way. Brackets 13 at the ends of the cowl support the filler board through projecting flanges 14 and the windshield through windshield stanchions 15 mounted on top of the brackets. The windshield and filler board are thus independently carried by the dash cowl.

The filler board 12 is composed of two sheet metal plates 16 and 17 preferably steel stampings joined at the top and sides but separated at the bottom to provide the opening 18. The top and side edges of the plate 17 are inwardly flanged at 19 and the top edge of the plate 16 is inwardly flanged at 20 while the side edges are offset as at 21. Bolts joining these plates pass through the flanges 19 and 20, at the top and through the flanges 19 and offset portions 21 at the sides.

At the top of the plate 16 in front of the flange 20 is a cross bar 22 which extends the length of the plate and into which the bolts 23 joining the plates 16 and 17 at the top enter. A metal strip 24 fastened to the lower edge of the windshield extends down between the flanges 19 and 20 and is secured by the bolts 23. The bolts 23 pass through slots 19' in the top flange 19 of the plate 17 so that that plate can be slipped on or off when the bolts are loosened. By this construction the front plate 16 of the filler board can be secured to the windshield and thus positioned relatively to the windshield and cowl before the rear plate 17 is set in place.

The front plate of the filler board is provided with ports through which air enters the filler board to pass out through the opening 18 into the front compartment of the motor vehicle. In this embodiment two ports 25 are provided having shutters 26 to regulate the amount of air supplied. The shutters turn on hinges 27, the hinge plates being secured to the shutters and to the cross bar 22, in any desirable manner. The shutters 26 are actuated by a rock shaft 27' mounted in plates 28 and having arms 29 connected to the shutters by links 30. Suitable means may be provided to oscillate the shaft and thus through the mechanism described to open or close the ports 25.

Below the rear end of the dash cowl 10 is a rear rail 31 to which the front plate 16 of the filler board is anchored by bolts 32 which also clamp the plates 28. Washers 33 of any desired thickness may be used to separate the plates 28 from the front plate 16 the required distance.

The front plate with its shutters in position can thus be secured to the dash cowl and to the windshield before the rear plate, which acts to protect and conceal the shutter mechanism and to direct the passage of air, is positioned by slipping the slotted flange 19 into place over the bolts 23 and then tightening the bolts.

The sides of the plates are united in the following manner. As best shown in Figs. 3 and 4, the inturned flange 19 at the side of the plate 17 overlies the offset portion 21 and both rest against the projecting flange 14 of the bracket 13. Bolts 34 of suitable length pass through openings in the flange and offset portion and engage threaded pockets 35 in the flange 14. See Fig. 4. The lower corners of the filler board which are behind the rear rail 31 are securely anchored by the means shown in Fig. 3, a bolt 36 passing through the rail as well as through the flange 14, offset portion 21 and flange 19.

The windshield is of the usual type provided at either end with a stanchion 15 mounted in the filler bracket 13. The stanchion here shown comprises a tube into which is fixed preferably by brazing a screw 37 tapered at the upper end and slightly below the middle, the lower end of the screw being straight. In the bracket 13 is an opening 38 tapered at the mouth to receive the lower tapered portion of the screw 37 and having threads cut therein near the bottom with which the threads of the screw 37 engage. The stanchion is screwed down until the tapered portions engage and it is thus held firmly fixed in place.

While one embodiment only of the invention is shown and described, it is obvious that others can be used without going beyond the spirit or scope of the invention as set forth in the annexed claims.

Having thus described my invention what I claim and desire to secure by Letters Patent is:

1. In a motor vehicle, in combination, a dash cowl, a windshield, a filler board, side brackets secured to the cowl for supporting said filler board, axially socketed stanchions for supporting said windshield, said brackets having tapered openings vertically alined with the sockets in the stanchions and tapered pins at the bottom of said stanchions engaging said openings.

2. In a motor vehicle, in combination, a dash cowl, a windshield, a filler board, side brackets secured to the cowl and extending above the same for supporting said filler board, hollow stanchions for supporting said windshield, said brackets having tapered openings in axial alinement with said stanchions and tapered pins at the bottom of said stanchions threaded into said openings.

3. In a motor vehicle, in combination, a dash cowl, a windshield, a filler board, said filler board comprising two plates, joined at the top by bolts, and a strip fastened at the top to the lower sash of the windshield and clamped at the bottom between the filler board and the plates.

4. In a motor vehicle, in combination, a dash cowl, having a rear rail, a filler board at the rear of said cowl and made up of two plates joined together and means for anchoring one plate of said filler board to said rail below the cowl.

5. In a motor vehicle, in combination, a dash cowl having a rear rail, a filler board at the rear of said cowl and made up of two plates joined together at the top and overlapped at the sides and means passing through said cowl rail and overlapped plates for securing said filler board to said cowl rail.

6. In a motor vehicle, in combination, a dash cowl, a windshield, hollow vertical side brackets on said cowl, hollow stanchions mounted on said brackets and axially alined therewith and positioning said windshield above said cowl with a space therebetween, a filler board mounted on said brackets independently of said stanchions for closing said space cowl rail to which edges of said filler board are secured, and ventilating shutter mechanism carried by said filler board.

7. In a motor vehicle, in combination, a dash cowl, a windshield, hollow side brackets on said cowl, hollow stanchions mounted on said brackets axially alined therewith and positioning said windshield above said cowl with a space therebetween, a two part filler board between said windshield and cowl, shutter mechanism carried by said board, cowl rail means for mounting one part of said filler board and said shutter mechanism on said cowl and windshield, means for later positioning said second part of said windshield, and means for joining said filler board parts to each other and to the side brackets, said parts of the filler board having overlapped edges secured to said rail.

In testimony whereof I affix my signature.

ORMOND E. HUNT.